United States Patent [19]

Mita et al.

[11] Patent Number: 5,543,844

[45] Date of Patent: Aug. 6, 1996

[54] METHOD AND APPARATUS FOR CODING IMAGE DATA

[75] Inventors: Hideaki Mita, Kobe; Tatusi Bannai, Osaka, both of Japan

[73] Assignee: Matsushita Electric Industrial Co., Ltd., Osaka, Japan

[21] Appl. No.: 150,526

[22] Filed: Nov. 9, 1993

[30] Foreign Application Priority Data

Nov. 25, 1992 [JP] Japan .................................. 4-314826
Apr. 1, 1993 [JP] Japan .................................. 5-075472

[51] Int. Cl.$^6$ .................................................. H04N 7/30
[52] U.S. Cl. ............................ 348/405; 348/27; 348/420
[58] Field of Search ............................ 348/27, 405, 419, 348/384, 415, 390, 400, 401, 403, 404, 409, 420

[56] References Cited

U.S. PATENT DOCUMENTS

| | | | |
|---|---|---|---|
| 5,073,820 | 12/1991 | Nakagawa et al. | |
| 5,144,426 | 9/1992 | Tanaka et al. | 348/409 |
| 5,245,427 | 9/1993 | Kunihiro | 348/409 |
| 5,291,282 | 3/1994 | Nakagawa et al. | 348/415 |
| 5,335,016 | 8/1994 | Nakagawa | 348/405 |

FOREIGN PATENT DOCUMENTS

| | | |
|---|---|---|
| 0400756 | 12/1990 | European Pat. Off. . |
| 0500077 | 8/1992 | European Pat. Off. . |
| 3-205963 | 9/1991 | Japan . |
| 4-207352 | 7/1992 | Japan . |

OTHER PUBLICATIONS

"Bit–rate Control for the JPEG Coding" by M. Sasaki et al; ITEC '92: 1992 ITE Annual Convention; pp., 323 and 324 (w/ whole English translation).

JPEG Technical Specification, Revision 5; JPEG–8–R5; Jan. 2, 1990;.

*Primary Examiner*—Thai Q. Tran
*Assistant Examiner*—Richard Lee
*Attorney, Agent, or Firm*—Lowe, Price, LeBlanc & Becker

[57] ABSTRACT

Input image data is divided into a plurality of blocks. An orthogonal transform device subjects the input image data to orthogonal transform every block. A memory temporarily stores output data from the orthogonal transform device. A first quantizer quantizes output data from the memory. A coding device codes output data from the first quantizer into variable-length code words. A code amount accumulation device accumulates a code amount of output data from the coding device. A second quantizer separates the output data from the orthogonal transform device into K different groups, and assigns M different scale factors to the respective blocks and quantizes the output data from the orthogonal transform device in the blocks with the related scale factors, where K and M denote predetermined natural numbers. A block code amount calculation device calculates a code amount per block. An initial scale factor calculation device determines an initial scale factor designed to make one of a frame or field into a predetermined code amount. A group target code amount calculation device predicts target code amounts in the respective groups from the block code amounts represented by the output data from the block code amount calculation device. A scale factor correcting device corrects the initial scale factor in response to a prediction error between an actual code amount accumulated by the code amount accumulation device and the predicted target code amount each time the coding device outputs the data of one group.

8 Claims, 12 Drawing Sheets

FIG. 2

| 1  | 2  | 6  | 7  | 15 | 16 | 28 | 29 |
|----|----|----|----|----|----|----|----|
| 3  | 5  | 8  | 14 | 17 | 27 | 30 | 43 |
| 4  | 9  | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

FIG. 3

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

METHOD AND APPARATUS FOR CODING IMAGE DATA

BACKGROUND OF THE INVENTION

1. Field of the Invention

This invention relates to a method and an apparatus for coding image data.

2. Description of the Prior Art

A highly efficient coding system for compressing a data amount is used in various apparatuses such as a communication apparatus, a recording and reproducing apparatus, a VCR, a VTR, and a display apparatus. Some of such coding systems use a code having variable-length words. Generally, it is desirable that coded data is outputted from a coding system at essentially a constant bit rate.

A system using orthogonal transform and a variable-length code is effective in efficiently coding data of natural images. It has been decided that this system is adopted in the international standards of coding of color natural image data (ISO/IEC JTC 1/SC2/WG8: JPEG Technical Specification, JPEG-8-R5, Jan. 2, 1990). Since this system uses the variable-length code, the amount (the number of bits) of coded output data tends to vary image by image. It should be noted that the code length of output data is a general term meaning the amount of coded output data.

Generally, an image data recording apparatus such as a VTR or a VCR is designed to record data at essentially a constant bit rate. To realize the recording of data at essentially a constant bit rate, it is necessary to control the amount of coded output data from a coding section image by image. Accordingly, systems for controlling the amount of coded data have been proposed (for example, ITEC '92:1992 ITE Annual Convention 16-15 "Bit-rate Control for the JPEG Coding").

In image data coding, it is general that every frame or field of image data is divided into a predetermined number of portions called blocks, and the image data is processed block by block.

In the system disclosed in the documents ITEC '92, during a first pre-scanning process, some blocks are selected from blocks composing one frame, and data in the selected blocks is quantized and coded with a first scale factor (a first scaling factor). In addition, the code amount in one frame is estimated from the mount of the coded data in the selected blocks, and a second scale factor (a second scaling factor) is set in response to a difference between the estimated code amount and a target code amount in one frame. During a second pre-scanning process following the first pre-scanning process, some blocks are selected from the blocks composing one frame, and data in the selected blocks is quantized and coded with the second scale factor. In addition, the code amount in one frame is estimated from the amount of the coded data in the selected blocks, and a third scale factor (a third scaling factor) is set in response to a difference between the estimated code amount and the target code amount in one frame and also in response to the second scale factor. Such a pre-scanning process is periodically repeated until a difference between the estimated code amount and the target code amount in one frame falls into an allowable range. The final scale factor obtained in the pre-scanning processes is used in a main scanning process for actually quantizing and coding data in all the blocks composing one frame.

In the system disclosed in the documents ITEC '92, the actually-used scale factor is thus updated every frame. Accordingly, during every main scanning process corresponding to one frame, the actually-used scale factor remains unchanged. In some cases, there occurs a large error between an actual code amount and the target code amount due to keeping the actually-used scale factor unchanged during one frame. The large error in one direction means that the actual code amount excessively overflows from the target code amount. When such an overflow occurs in a VTR or a VCR, an end portion of image data can not be recorded.

SUMMARY OF THE INVENTION

It is an object of this invention to provide an improved apparatus for coding image data.

It is another object of this invention to provide an improved method of coding image data.

A first aspect of this invention provides an image data coding apparatus comprising means for dividing input image data into a plurality of blocks; an orthogonal transform device for subjecting the input image data to orthogonal transform for every block; a memory for storing output data from the orthogonal transform device and outputting the stored data in a predetermined order; a first quantizer for quantizing output data from the memory; a coding device for coding output data from the first quantizer into variable-length code words; a code amount accumulation device for accumulating a code amount of output data from the coding device; a second quantizer for separating the output data from the orthogonal transform device into K different groups according to the data output order in the memory, and for assigning M different scale factors to the respective blocks and quantizing the output data from the orthogonal transform device in the blocks with the related scale factors, where K and M denote predetermined natural numbers; a block code amount calculation device for calculating a code amount per block which results from assumptive variable-length coding of output data from the second quantizer; an initial scale factor calculation device for predicting M code amounts, which result from assumptive coding of one of a frame or a field with the M scale factors respectively, from block code amounts represented by output data from the block code amount calculation device, and for determining an initial scale factor designed to make said one of a frame or field into a predetermined code amount; a group target code amount calculation device for predicting target code amounts in the respective groups, which result from assumptive coding and quantization with the initial scale factor, from the block code amounts represented by the output data from the block code amount calculation device; and a scale factor correcting device for correcting the initial scale factor in response to a prediction error between an actual code amount accumulated by the code amount accumulation device and the predicted target code amount each time the coding device outputs the data of one group, and thereby for correcting the scale factor in the first quantizer.

A second aspect of this invention provides an image data coding apparatus comprising a channel dividing device for alternately dividing blocks composing one of a frame and a field into a plurality of channels; orthogonal transform devices for subjecting output data from the channel dividing device in the respective channels to orthogonal transform every block; memories for delaying output data from the orthogonal transform devices respectively; quantizers for quantizing output data from the memories respectively; coding devices for coding output data from the respective quantizers into variable-length code words; and means for determining an initial scale factor in common to all the channels in response to the output data from the orthogonal transform devices, the initial scale factor being designed to make a code amount in one of the frame and the field approximately equal to a given amount.

A third aspect of this invention provides an image data coding apparatus comprising means for quantizing image data into first quantized image data in response to a correctable first scale factor; means for coding the first quantized image data into first coded data; means for quantizing the image data into second quantized image data in response to predetermined different second scale factors; means for estimating total numbers of coded data bits, which relate to the second scale factors respectively, in one of a frame and a field from the second quantized image data; means for determining an initial scale factor in response to said estimated total numbers of coded data bits and a predetermined target total number of coded data bits in said one of the frame and the field; means for accumulating the first coded data in bit number to detect an actual accumulation bit number of the first coded data during a period corresponding to said one of the frae and the field; means for estimating a predicted accumulation number of coded data bits in response to the second quantized image data and the initial scale factor during a period corresponding to said one of the frame and the field; means for periodically calculating a prediction error between the actual accumulation bit number and the predicted accumulation bit number during a period corresponding to said one of the frame and the field; and means for periodically correcting the first scale factor in response to the prediction error during a period corresponding to said one of the frame and the field.

A fourth aspect of this invention provides a method comprising the steps of quantizing image data into first quantized image data in response to a correctable first scale factor; coding the first quantized image data into first coded data; quantizing the image data into second quantized image data in response to predetermined different second scale factors; estimating total numbers of coded data bits, which relate to the second scale factors respectively, in one of a frame and a field from the second quantized image data; determining an initial scale factor in response to said estimated total numbers of coded data bits and a predetermined target total number of coded data bits in said one of the frae and the field; accumulating the first coded data in bit number to detect an actual accumulation bit number of the first coded data during a period corresponding to said one of the frame and the field; estimating a predicted accumulation number of coded data bits in response to the second quantized image data and the initial scale factor during a period corresponding to said one of the frame and the field; periodically calculating a prediction error between the actual accumulation bit number and the predicted accumulation bit number during a period corresponding to said one of the frame and the field; and periodically correcting the first scale factor in response to the prediction error during a period corresponding to said one of the frame and the field.

BRIEF DESCRIPTION OF THE DRAWINGS

FIG. 2 is a diagram of an order in which DCT coefficients in one block are scanned.

FIG. 3 is a diagram of quantization steps assigned to respective DCT coefficients in one block.

DESCRIPTION OF THE FIRST PREFERRED EMBODIMENT

In the following description, the amount of coded data means the number of bits of coded data. In the field of data compression, the amount of coded data and the number of bits of coded data are generally referred to as the code length of coded data. In addition, control of the amount of coded data or control of the number of bits of coded data is generally referred to as rate control of coded data.

Figure 1:
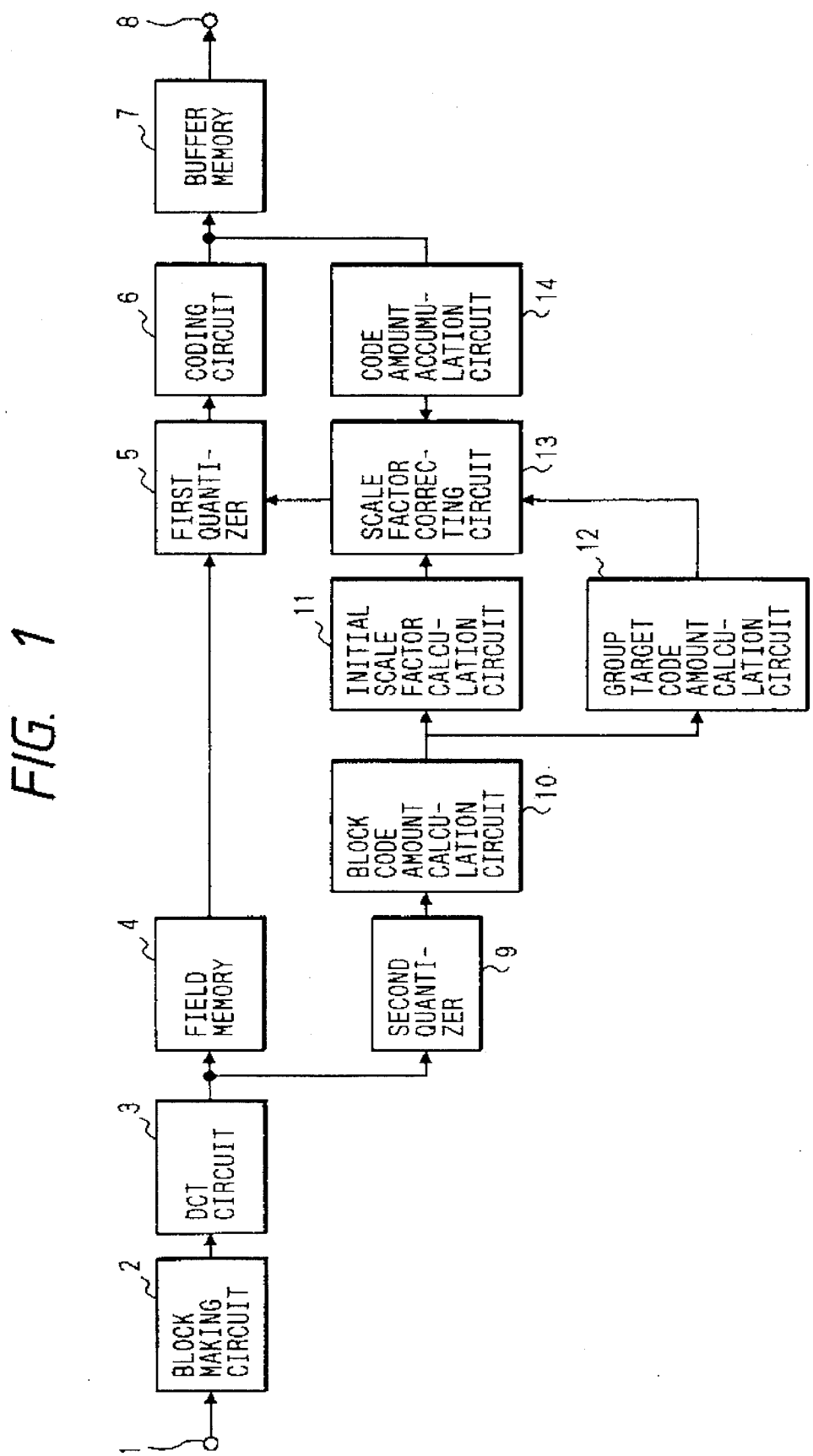
FIG. 1 is a block diagram of an image data coding apparatus according to a first embodiment of this invention.

With reference to FIG. 1, an image data coding apparatus of a first embodiment of this invention includes an input terminal 1 connected to a block making circuit 2 which is followed by a DCT (discrete cosine transform) circuit 3. The DCT circuit 3 is connected to a field memory 4 sequentially followed by a first quantizer 5 and a Huffman coding circuit 6. The Huffman coding circuit 6 is connected to a buffer memory 7. The DCT circuit 3 is also connected to a second quantizer 9 followed by a block code amount calculation circuit 10. The block code amount calculation circuit 10 is connected to an initial scale factor calculation circuit 11 and a group target code amount calculation circuit 12. The initial scale factor calculation circuit 11 and the group target code amount calculation circuit 12 are connected to a scale factor correcting circuit 13. A code amount accumulation circuit 14 which follows the Huffman coding circuit 6 is also connected to the scale factor correcting circuit 13. The scale factor correcting circuit 13 is connected to the first quantizer 5. The buffer memory 7 is connected to an output terminal 8.

Input image data is fed via the input terminal 1 to the block making circuit 2 in which the image data of every field is divided into a predetermined number of blocks each corresponding to 8 by 8 pixels. The block making circuit 2 outputs the image data of successive blocks. The DCT circuit 3 following the block making circuit 2 subjects the image data of each of successive blocks to discrete cosine transform (DCT) which is a kind of orthogonal transform. Thus, the DCT circuit 3 converts the image data of each block into 64 DCT coefficients.

As shown in FIG. 2, the 64 DCT coefficients which correspond to one block are scanned in zigzag, being sequentially outputted from the DCT circuit 3 in a zigzag order. In FIG. 2, 8 by 8 small squares correspond to 64 DCT coefficients respectively, and the numerals in the small squares denote the numbers by which the related DCT coefficients are outputted from the DCT circuit 3.

The DCT coefficients outputted from the DCT circuit 3 are fed to a field memory 4, being temporarily stored in the field memory 4 and being then outputted therefrom. Thereby, the DCT coefficients are delayed by a given period corresponding to one field. A first quantizer 5 receives the DCT coefficients from the field memory 4, and linearly quantizes the DCT coefficients with variable quantization values which are determined for the respective DCT coefficients.

As will be described later, the quantization values are equal to quantization steps multiplied by a variable scale factor $\alpha t$ fed to the first quantizer 5 from the scale factor correcting circuit 13. It should be noted that "scale factor" is generally referred to as "scaling factor". As shown in FIG. 3, the quantization steps vary DCT coefficient by DCT coefficient. In FIG. 3, 8 by 8 small squares correspond to the 64 DCT coefficients respectively, and the numerals in the small squares denote the quantization steps corresponding to the related DCT coefficients respectively.

A Huffman coding circuit 6 following the first quantizer 5 codes the output data from the first quantizer 5 into a two-dimensional Huffman code having variable-length words. The Huffman coding circuit 6 outputs the Huffman code words as variable-length coded data which is stored into the buffer memory 7. Information or data representing the scale factor $\alpha t$ fed to the first quantizer 5 is also stored into the buffer memory 7. The variable-length coded data and the scale factor data are read out from the buffer memory 7, being transmitted via the output terminal 8 at a predetermined bit rate.

The DCT coefficients outputted from the DCT circuit 3 are directly fed to the second quantizer 9. On the other hand, as previously described, the DCT coefficients outputted from the DCT circuit 3 are fed to the first quantizer 5 via the field memory 4 which provides the DCT coefficients with a one-field delay. The one-field delay provided by the field memory 4 enables the second quantizer 9 and the subsequent circuits 10, 11, and 12 to operate during a pre-scanning process which precedes a main scanning process executed by the first quantizer 5 and the subsequent Huffman coding circuit 6.

Figure 4:
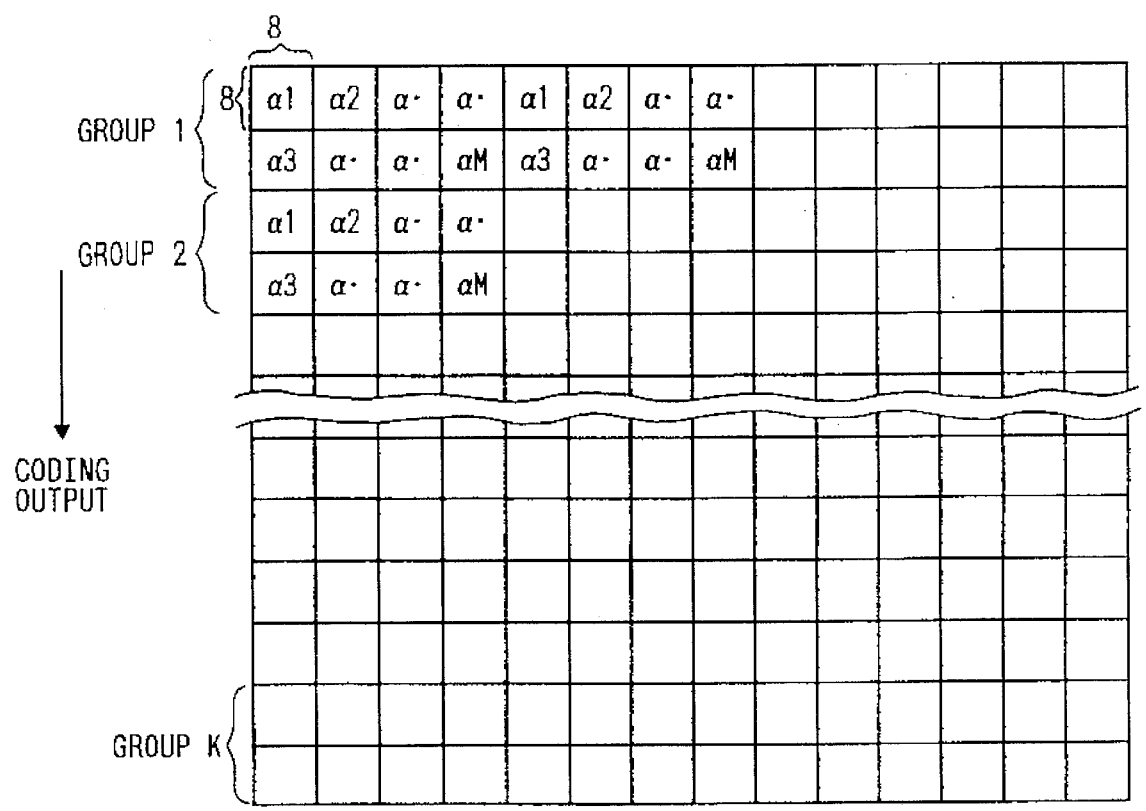
FIG. 4 is a diagram of the relation among blocks, groups, and assigned scale factors in one field.

As previously described, the DCT coefficients outputted from the DCT circuit 3 are fed to the second quantizer 9. During the pre-scanning process, the second quantizer 9 operates as follows. In the second quantizer 9, as shown in FIG. 4, the blocks composing one field are separated into K different groups according to the order of outputting of coded data where K denotes a predetermined natural number equal to two or greater. Furthermore, M different scale factors $\alpha 1, \alpha 2, \ldots, \alpha M$ having a relation as "$\alpha 1 < \alpha 2 < \ldots < \alpha M$" are assigned to the blocks composing one field where M denotes a predetermined natural number equal to two or greater. The numbers K and M are chosen so that the number of the blocks composing one field is equal to a multiple of the product of K and M. Specifically, in each of the K groups, the scale factors $\alpha 1, \alpha 2, \ldots, \alpha M$ are assigned to equal numbers of the blocks respectively. Furthermore, in each of the K groups, the scale factors $\alpha 1, \alpha 2, \ldots, \alpha M$ are sequentially and cyclically assigned to the blocks in a predetermined order accorded with the order of the positions of the blocks relative to the field. Thus, the manners of the assignment of the scale factors $\alpha 1, \alpha 2, \ldots, \alpha M$ to the blocks in the K groups are equal to each other. It should be noted that, in each of the K groups, the scale factors $\alpha 1, \alpha 2, \ldots, \alpha M$ may be assigned to the blocks at random.

In the second quantizer 9, as shown in FIG. 3, the different quantization steps are assigned to the DCT coefficients corresponding to one block respectively. Thus, one of the scale factors $\alpha 1, \alpha 2, \ldots, \alpha M$ and one of the quantization steps are assigned to a DCT coefficient. The assigned scale factor varies block by block while the assigned quantization step varies DCT coefficient by DCT coefficient. The second quantizer 9 linearly quantizes each DCT coefficient with a quantization value which is equal to the product of the assigned scale factor and the assigned quantization step.

During the pre-scanning process, the block code amount calculation circuit 10 operates as follows. The block code amount calculation circuit 10, which follows the second quantizer 9, uses the output data therefrom in calculating or estimating the amount (the number of bits) of coded data per block which results from assumptive two-dimensional Huffman coding of the DCT coefficients quantized by using one of the scale factors $\alpha 1, \alpha 2, \ldots, \alpha M$. Thus, the block code amount calculation circuit 10 calculates the amount of coded data per block, that is, the one-block code amount (generally referred to as the block length). Specifically, the block code amount calculation circuit 10 includes a ROM in which a plurality pieces of information of amounts of coded data are stored in storage locations of different addresses which can be designated according to combinations of 0-run data and non-0-coefficient data in the output data from the second quantizer 9. The calculation or estimation of the coded data amount is executed by referring to the information in the ROM in response to the output data from the second quantizer 9. It should be noted that the block code amount calculation circuit 10 may include a Huffman coding circuit.

During the pre-scanning process, the initial scale factor calculation circuit 11 operates as follows. The initial scale factor calculation circuit 11, which follows the block code amount calculation circuit 10, is sequentially informed of the calculated amounts of coded data in the respective blocks by the block code amount calculation circuit 10. Regarding each "j" ($1 \leq j \leq K$) of the K groups, the initial scale factor calculation circuit 11 calculates the sum N(i, j) of the coded data amounts in the blocks to which the same scale factor $\alpha i$ ($1 \leq i \leq M$) is assigned. Thus, the total number of the calculated sums N(i, j) is equal to the product of K and M. The initial scale factor calculation circuit 11 predicts the amount Ni of coded data in one field, which results from assumptive two-dimensional Huffman coding of the DCT coefficients quantized by using a scale factor $\alpha i$, from the sums N(i, j) by referring to the following equation.

$$Ni = M \cdot \sum_{j=1}^{K} N(i, j) \tag{1}$$

Figure 5:
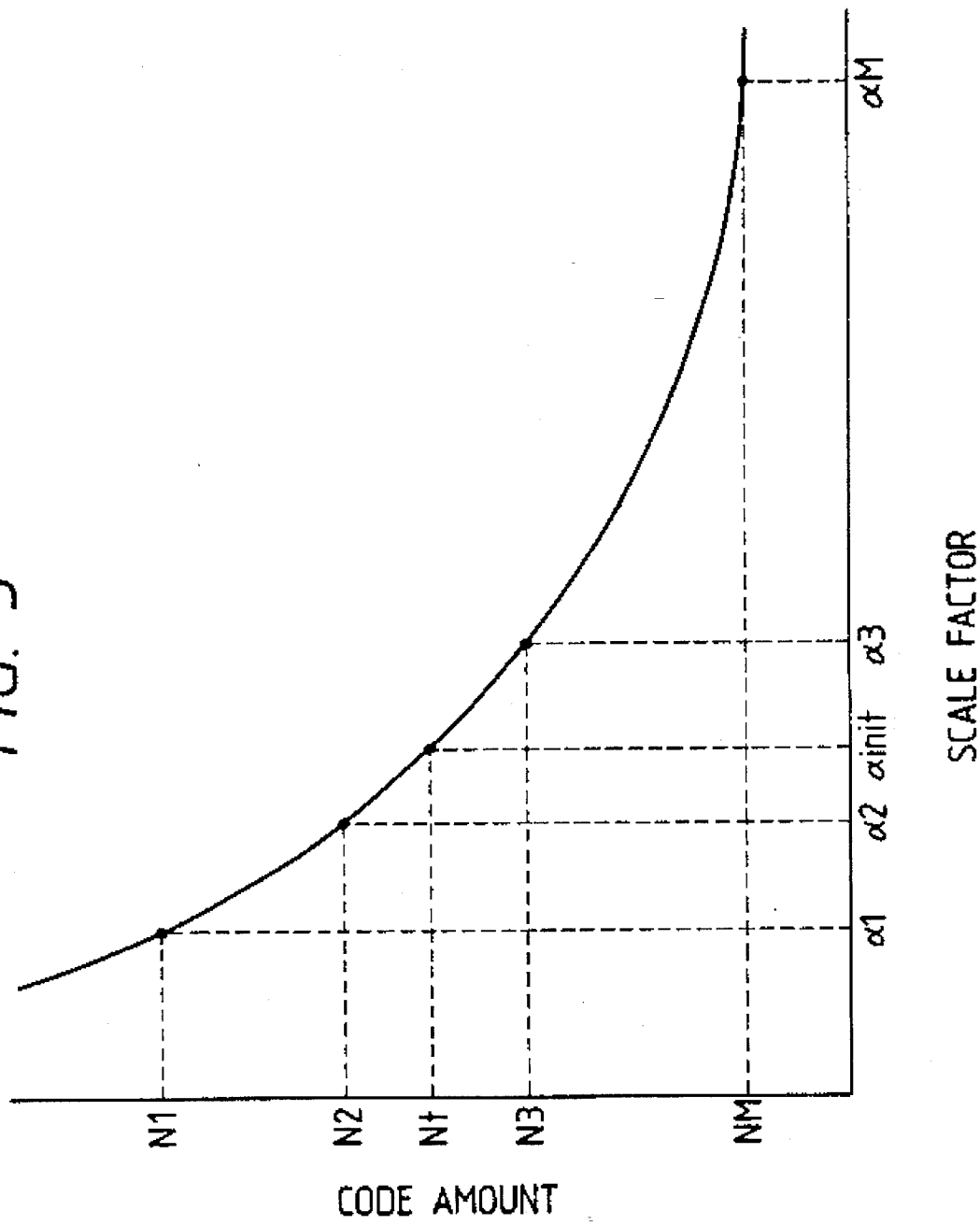
FIG. 5 is a diagram of the relation between a scale factor and a code amount in one field.

Thus, there are predicted one-field code amounts N1, N2, ..., NM corresponding to the scale factors $\alpha 1, \alpha 2, \ldots, \alpha M$ respectively. It should be noted that, as shown in FIG. 5, the code amount Ni decreases in accordance with increases in the scale factor $\alpha i$. Finally, the initial scale factor calculation circuit 11 calculates an initial scale factor $\alpha init$ on the basis of a predetermined target one-field code amount Nt, the predicted one-field code amounts N1, N2, ..., NM, and the scale factors α1, α2, ..., αM. It should be noted that "target code amount" is generally referred to as "target code length". The initial scale factor αinit is designed so that an actual one-field code amount can be essentially equal to the target one-field code amount Nt. For example, when the target code amount Nt exists between the predicted code amounts N2 and N3 as shown in FIG. 5, the initial scale factor αinit is calculated from the scale factors α2 and α3, the predicted code amounts N2 and N3, and the target code amount Nt through interpolation based on the straight line connecting the point (α2, N2) and the point (α3, N3). Specifically, in this case, the calculation of the initial scale factor αinit is executed by referring to the following equation.

$$\alpha init = \alpha 2 + \frac{(\alpha 3 - \alpha 2) \cdot (N2 - Nt)}{N2 - N3} \quad (2)$$

During the pre-scanning process, the group target code amount calculation circuit 12 operates as follows. The group target code amount calculation circuit 12, which follows the block code amount calculation circuit 10, is sequentially informed of the calculated amounts of coded data in the respective blocks by the block code amount calculation circuit 10. The group target code amount calculation circuit 12 executes calculation similar to the calculation by the initial scale factor calculation circuit 11. Specifically, regarding each "j" (1≤j≤K) of the K groups, the group target code amount calculation circuit 12 calculates the sum N(i, j) of the coded data amounts in the blocks to which the same scale factor αi (1≤j≤M) is assigned. The group target code amount calculation circuit 12 predicts the amount Nj of coded data in each "j" of the K groups, which results from assumptive two-dimensional Huffman coding of the DCT coefficients quantized by using the initial scale factor αinit in common for the blocks, from the sums N(i, j) and the target one-field code amount Nt by referring to the equation given as:

$$Nj = Nt \cdot \left\{ \sum_{i=1}^{M} N(i,j) \right\} / \left\{ \sum_{j=1}^{K} \sum_{i=1}^{M} N(i,j) \right\} \quad (3)$$

The equation (3) is based on the following fact. In each of the K groups, the scale factors α1, α2, ..., αM are assigned to equal numbers of the blocks respectively. Thus, regarding a ratio with respect to a one-field code amount, the sum of the code amounts related to the respective M scale factors α1, α2, ..., αM in each group "j" can be substantially equal to a code amount in the group "j" which results from assumptive two-dimensional Huffman coding of the DCT coefficients quantized by using a certain scale factor in common for the blocks. Regarding the equation (3), the addition of the sums N(1, j), N(2, j), ..., N(M, j) is generally defined as an activity of the group "j". In addition, the addition of the sums N(1, 1), N(2, 1), ..., N(M, 1), N(1, 2), N(2, 2), ..., N(M, 2), ..., N(1, K), N(2, K), ..., N(M, K) is generally defined as an activity of the present field. When the group activity and the field activity are denoted by Gact and Fact respectively, the equation (3) is rewritten into the following equation.

*Nj=Nt.Gact/Fact* where the term "Gact/Fact" represents normalization.

Figure 6:
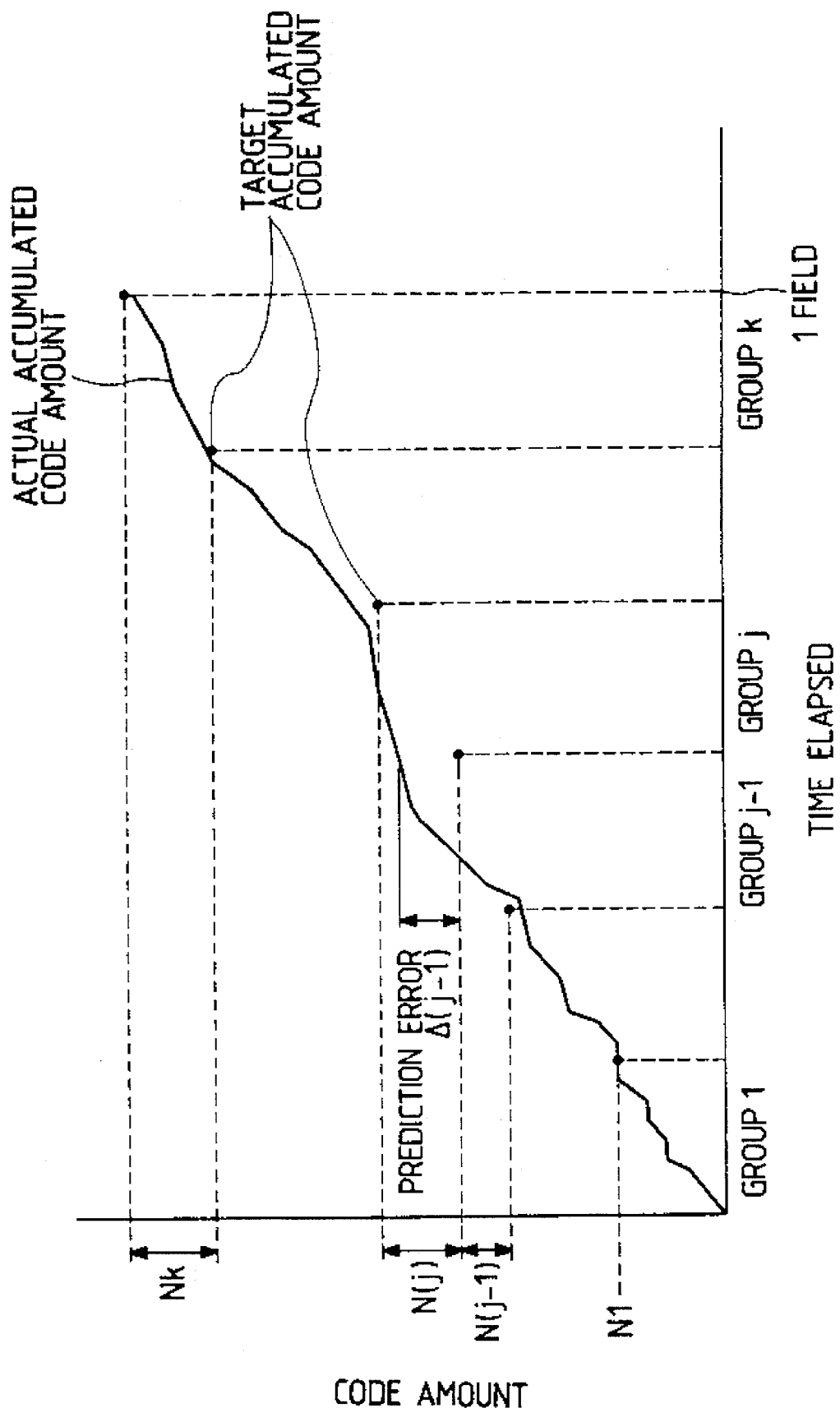
FIG. 6 is a diagram of an example of time-domain variations in an accumulated code amount in the first embodiment.

A code amount accumulation circuit 14 receives the output coded data from the Huffman coding circuit 6. The code amount accumulation circuit 14 accumulates the coded data in bit number and thereby calculates the accumulated amount (the accumulated number of bits) of the coded data, that is, the actual accumulated code amount. As shown in FIG. 6, the actual accumulated code amount increases according to the time elapsed, and is reset to zero at a start of every field.

The scale factor correcting circuit 13 is informed of the predicted code amounts Nj in the respective groups "j" by the group target code amount calculation circuit 12. In addition, the scale factor correcting circuit 13 is informed of the actual accumulated code amount by the code amount accumulation circuit 14. Furthermore, the scale factor correcting circuit 13 is informed of the initial scale factor αinit by the initial scale factor calculation circuit 11. The scale factor correcting circuit 13 accumulates and adds the predicted one-group code amounts Nj into a predicted accumulated code amount (a target accumulated code amount) which occurs upon the completion of the coding of each group. As shown in FIG. 6, the predicted accumulated code amount increases stepwise each time the coding of one group is completed. In addition, the predicted accumulated code amount is reset to zero at a start of every field. The predicted accumulated code amount which occurs at an end of every field corresponds to the target one-field code amount Nt. The scale factor correcting circuit 13 calculates a prediction error Δ which is equal to the difference between the predicted accumulated code amount and the actual accumulated code amount for every group. Each time the coding and outputting of data in one group is completed, the scale factor correcting circuit 13 corrects the scale factor at for a next group in accordance with the calculated prediction error Δ. The variable Δ(j-1) is now introduced as an indication of the prediction error between the predicted accumulated code amount and the actual accumulated code amount for a group (j-1). When the coding of data in a group (j-1) is completed, the scale factor correcting circuit 13 feeds the first quantizer 5 with the correction-resultant scale factor αt which is designed so that a target total amount of coded data in a group "j" and later groups can be given as:

$$\sum_{k=j}^{K} Nk - \Delta(j-1) \quad (4)$$

As a result, the prediction error Δ(j-1) is canceled, and hence the actual accumulated code amount can be exactly or approximately equal to the target accumulated code amount (the predicted accumulated code amount) for the group "j" and the later groups.

Figure 7:
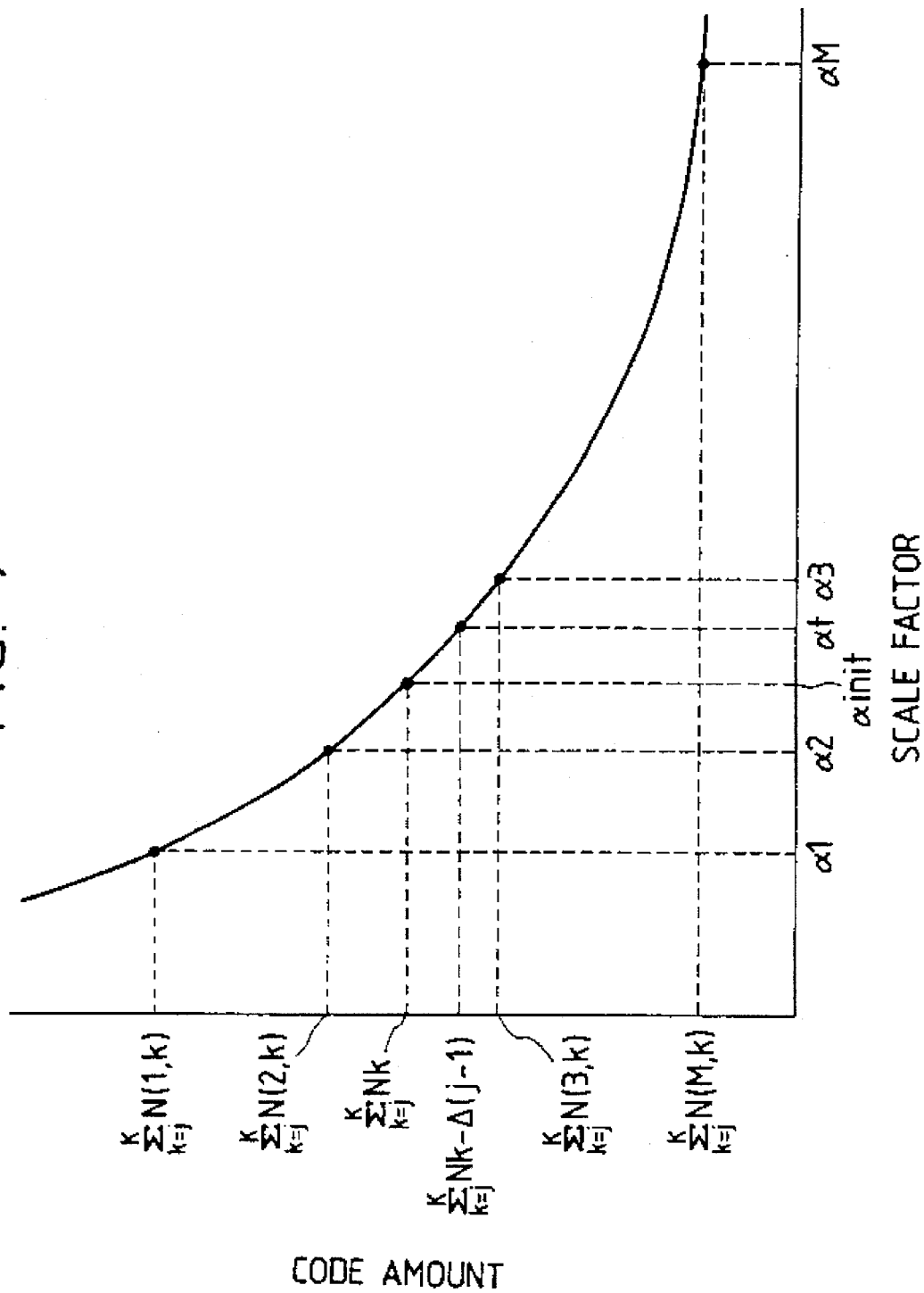
FIG. 7 is a diagram of the relation between a scale factor and a code amount in a group "j" and later groups in the first embodiment.

As shown in FIG. 7, the accumulated code amount decreases in accordance with increases in the scale factor. The scale factor correcting circuit 13 calculates the corrected (correction-resultant) scale factor αt by referring to the relation between the accumulated code amount and the scale factor in FIG. 7. As previously described, the corrected scale factor αt is designed so that the target total amount of coded data in the group "j" and the later groups can be given by the equation (4). Specifically, the calculation of the corrected scale factor αt is executed by linear interpolation given as:

$$\alpha t = \alpha init + \{(\alpha 3 - \alpha init) \cdot \Delta(j-1)\} / \left\{ \sum_{k=j}^{K} Nk - \sum_{k=j}^{K} N(3,k) \right\} \quad (5)$$

When the prediction error is equal to zero, the corrected scale factor αt is set to the initial scale factor αinit so that the quantization will be executed according to the initial scale factor αinit. For the first group in every frae, the corrected scale factor αt is also set to the initial scale factor αinit.

As previously described, in this embodiment, the blocks composing one field are separated into the K groups, and DCT data is quantized with the M different scale factors during the pre-scanning process. The resultant block code amounts are used by the initial scale factor calculation circuit 10 in calculating the initial scale factor $\alpha init$ which is designed to substantially equalize the actual one-field code amount and the target one-field code amount. The group target code amount calculation circuit 12 predicts the amounts of coded data in the respective K groups which result from the quantization using the Initial scale factor $\alpha init$ in common for the blocks. Thus, only a single pre-scanning process enables the calculation of the initial scale factor $\alpha init$ and the prediction of the amounts of coded data in the respective K groups. The code amount accumulation circuit 14 derives the actual accumulated code amount. The scale factor correcting circuit 13 derives the target accumulated code amount. The scale factor correcting circuit 13 calculates the prediction error between the actual accumulated code amount and the target accumulated code amount for every group, and periodically adjusts the actually-used scale factor and thereby controls the amount of output coded data in response to the prediction error. Accordingly, during each one-field interval, the code amount control is periodically executed a number of times which equals K. Thus, the code amount control can be fine and reliable.

According to a modification of this embodiment, the scale factor correcting circuit 13 calculates the corrected scale factor $\alpha t$ by referring to the relation between the code amount and the scale factor in FIG. 5. Specifically, the calculation of the corrected scale factor $\alpha t$ is executed by linear interpolation given as:

$$\alpha t = \alpha init + \frac{(\alpha 3 - \alpha init) \cdot \Delta(j-1)}{Nt - N3} \cdot \left\{ Nt / \sum_{l=j}^{K} Nl \right\} \quad (6)$$

The modification of this embodiment enables a reduction in circuit scale.

DESCRIPTION OF THE SECOND PREFERRED EMBODIMENT

A second embodiment of this invention is similar to the embodiment of FIGS. 1–7 except for a scale factor correcting circuit 13 (see FIG. 1).

Figure 8:
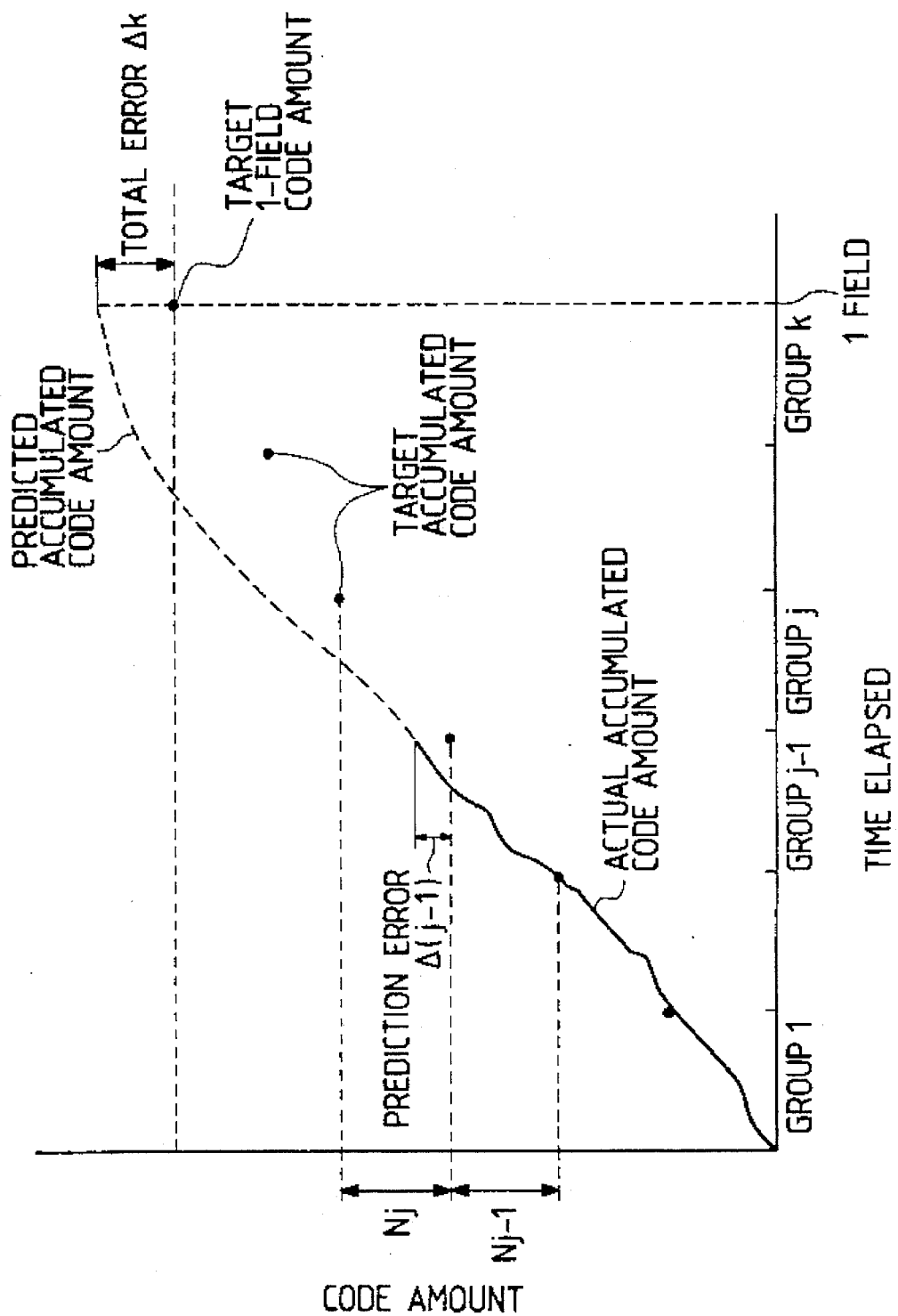
FIG. 8 is a diagram of an example of time-domain variations in an accumulated code amount in an image coding apparatus according to a second embodiment of this invention.

As shown in FIG. 8, the actual accumulated code amount increases in accordance with the time elapsed, and is reset to zero at a start of every field. In the second embodiment, the scale factor correcting circuit 13 predicts the one-field error $\Delta K$ between the predicted accumulated code amount and the actual accumulated code amount which occurs at an end of every field. The prediction of the one-field error $\Delta K$ is executed each time the coding of a group is completed. The one-field prediction error $\Delta K$, which is calculated upon the end of the coding of a group (j-1), is given as:

$$\Delta K = \Delta(j-1) \cdot \left\{ Nt / \sum_{l=1}^{j-1} Nl \right\} \quad (7)$$

where the character A(j-1) denotes the one-group prediction error between the predicted accumulated code amount and the actual accumulated code amount for the group (j-1). When the coding of data in the group (j-1) is completed, the scale factor correcting circuit 13 feeds the first quantizer 5 (see FIG. 1) with the corrected (correction-resultant) scale factor $\alpha t$ which is designed to nullify the error between the target accumulated code amount (the predicted accumulated code amount) and the actual accumulated code amount which occurs upon the end of the coding of the present field. As a result, the prediction error $\Delta K$ is canceled, and hence the actual accumulated code amount can be exactly or approximately equal to the target accumulated code amount (the predicted accumulated code amount) which occurs upon the end of the coding of the present field.

The scale factor correcting circuit 13 calculates the corrected scale factor $\alpha t$ by referring to the relation between the accumulated code amount and the scale factor. As previously described, the corrected scale factor at is designed to nullify the error between the target accumulated code amount (the predicted accumulated code amount) and the actual accumulated code amount which occurs upon the end of the coding of the present field. Specifically, the calculation of the corrected scale factor $\alpha t$ is executed by linear interpolation given as:

$$\alpha t = \alpha init + \{(\alpha 3 - \alpha init) \cdot \Delta K\} / \left\{ \sum_{k=j}^{K} Nk - \sum_{k=j}^{K} N(3, k) \right\} \quad (8)$$

When the prediction error $\Delta K$ is equal to zero, the corrected scale factor $\alpha t$ is set to the initial scale factor $\alpha init$ so that the quantization will be executed according to the initial scale factor $\alpha init$. For the first group in every frae, the corrected scale factor $\alpha t$ is also set to the initial scale factor $\alpha init$.

According to a modification of this embodiment, the scale factor correcting circuit 13 calculates the corrected scale factor $\alpha t$ by referring to the relation between the code amount and the scale factor in FIG. 5. Specifically, the calculation of the corrected scale factor $\alpha t$ is executed by linear interpolation given as:

$$\alpha t = \alpha init + \frac{(\alpha 3 - \alpha init) \cdot \Delta K}{Nt - N3} \cdot \left\{ Nt / \sum_{l=j}^{K} Nl \right\} \quad (9)$$

The modification of this embodiment enables a reduction in circuit scale.

DESCRIPTION OF THE THIRD PREFERRED EMBODIMENT

Figure 9:
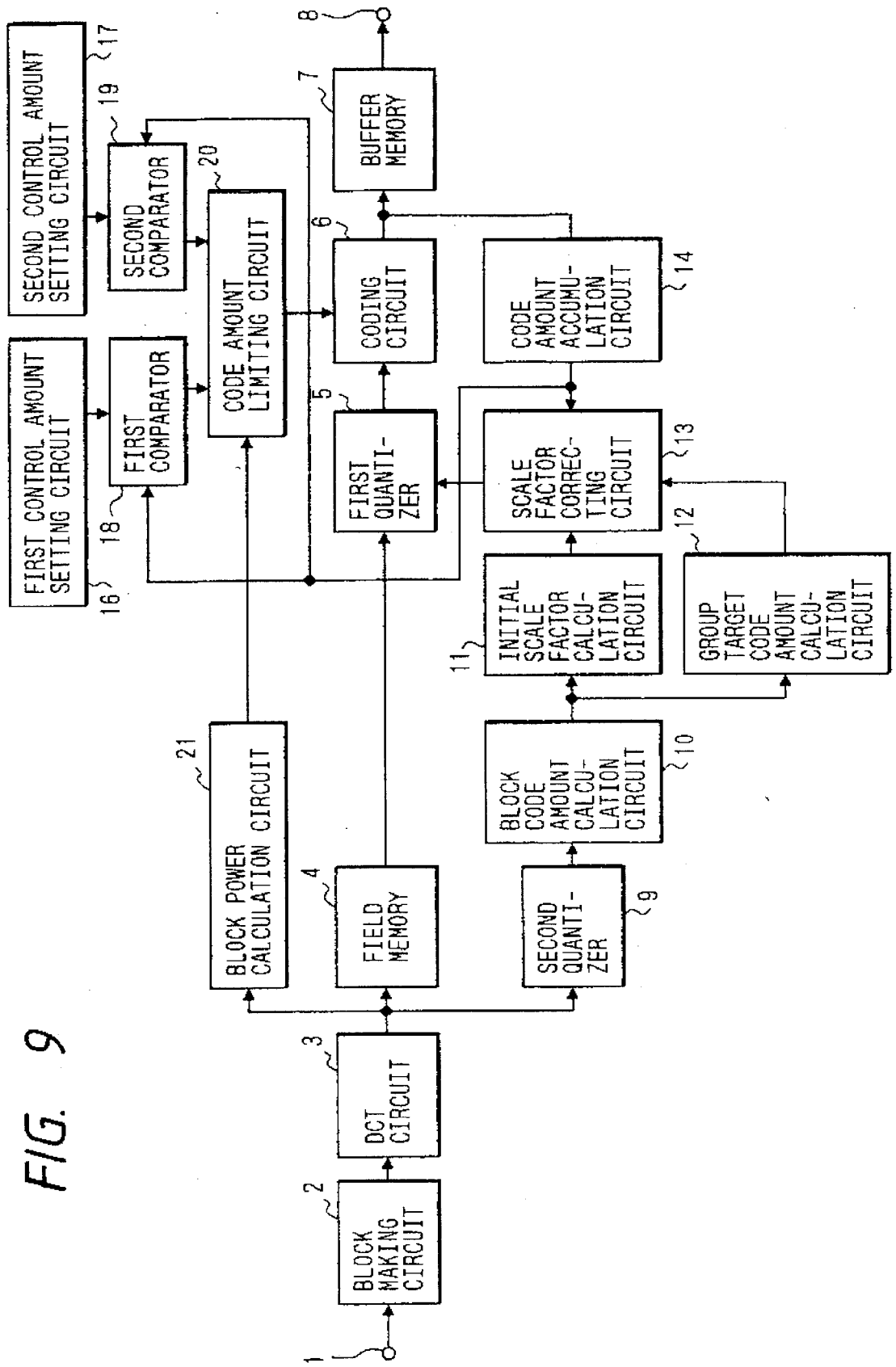
FIG. 9 is a block diagram of an image data coding apparatus according to a third embodiment of this invention.

FIG. 9 shows a third embodiment of this invention which is similar to the embodiment of FIGS. 1–7 except for an additional arrangement indicated hereinafter.

The embodiment of FIG. 9 includes first and second code amount setting circuits 16 and 17, first and second comparators 18 and 19, a code amount limiting circuit 20, and a block power calculation circuit 21. The first and second code amount setting circuits 16 and 17 are connected to the first and second comparators 18 and 19 respectively. The first and second comparators 18 and 19 are connected to a code amount accumulation circuit 14. The code amount limiting circuit 20 is connected to the first and second comparators 18 and 19, and a Huffman coding circuit 6. The block power calculation circuit 21 is connected between a DCT circuit 3 and the code amount limiting circuit 20.

Figure 10:
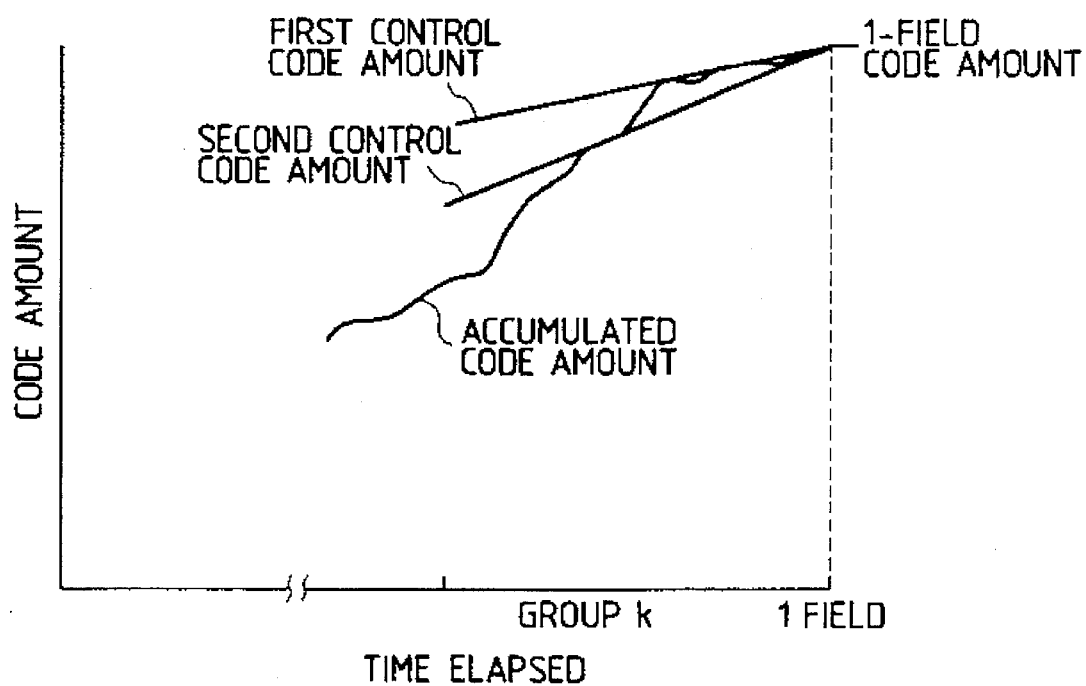
FIG. 10 is a diagram of an example of time-domain variations in an accumulated code amount, and time-domain variations in first and second control code amounts in the third embodiment.

The first code amount setting circuit 16 functions to set a first control code amount corresponding to the number of uncoded blocks. The second code amount setting circuit 17 functions to set a second control code amount corresponding to the number of uncoded blocks. Specifically, during an interval of the coding of the final group K in every field, the first and second code amount setting circuits 16 and 17 set the first and second control code amounts which linearly increase toward a target one-field code amount in accordance with the time elapsed as shown in FIG. 10. The first and second control code amounts reach the target one-field code amount upon an end of the coding of every field. The first and second control code amounts agree with accumulated code amounts which are predicted under conditions where given constant code amounts L1 and L2 occur per block respectively. The constant code amount L1 is smaller than the constant code amount L2. The first control code amount corresponds to conditions where only a DC coefficient of the DCT coefficients is coded. The second control code amount corresponds to conditions where all the DCT coefficients are coded. It should be noted that a complete set of the DCT coefficients has an average component (a DC coefficient) and alternating components (AC coefficients).

The first comparator 18 receives information of the first control code amount from the first code amount setting circuit 16. The first comparator 18 receives information of the actual accumulated code amount from the code amount accumulation circuit 14. The first comparator 18 compares the first control code amount and the actual accumulated code amount, and informs the code amount limiting circuit 20 of the result of the comparison. The second comparator 19 receives information of the second control code amount from the second code amount setting circuit 17. The second comparator 19 receives information of the actual accumulated code amount from the code amount accumulation circuit 14. The second comparator 19 compares the second control code amount and the actual accumulated code amount, and informs the code amount limiting circuit 20 of the result of the comparison.

The block power calculation circuit 21 is informed of the DCT coefficients by the DCT circuit 3. The block power calculation circuit 21 calculates the sum PW of powers from the DCT coefficients for every block. As previously described, the total number of the DCT coefficients is equal to 64. The DCT coefficients are now identified by the characters D(i) where i=0, 1, 2, ..., 63. Specifically, the calculation of the sum PW of powers is executed by referring to the following equation.

$$PW = \sum_{i=1}^{63} \{D(i)\}^2 \qquad (10)$$

It should be noted that D(0) denotes a DC coefficient which provides no power. The block power calculation circuit 21 informs the code amount limiting circuit 20 of the calculated sum PW of powers, that is, the block power PW.

The code amount limiting circuit 20 controls the Huffman coding circuit 6 in response to the information from the first comparator 18, the information from the second comparator 19, and the information from the block power calculation circuit 21. Specifically, in the case where the first comparator 18 detects that the actual accumulated code amount exceeds the first control code amount, the code amount limiting circuit 20 controls the Huffman coding circuit 6 in response to the information from the first comparator 18 so that only the DC coefficient of the DCT coefficients will be coded. In the case where the second comparator 19 detects that the actual accumulated code amount exceeds the second control code amount, the code amount limiting circuit 20 controls the Huffman coding circuit 6 in response to the information from the second comparator 19 so that the amounts of resultant coded data will remain in amounts LG which are assigned to the blocks according to the block powers PW respectively.

The letter B is now introduced as an indication of the total number of the blocks composing one field. The block power of the n-th block is denoted by the character PW(n). The assigned code amount LG(n) for the n-th block is determined according to the following equation.

$$LG(n) = \{PW(n) \cdot L2\} / \left\{ \sum_{i=n}^{B} PW(i)/(B-n) \right\} \qquad (11)$$

Figure 11:
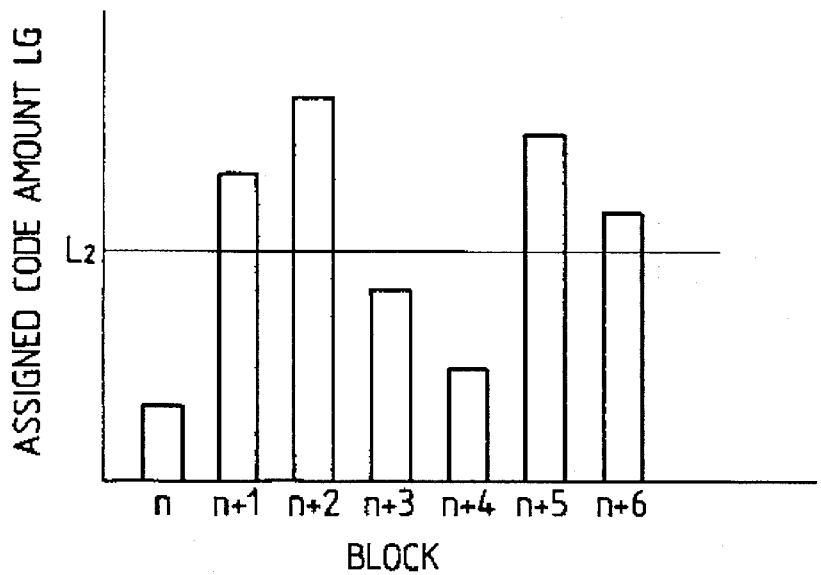
FIG. 11 is a diagram of an example of the relation between blocks and assigned code amounts in the third embodiment.

The assigned code amount LG varies block by block as shown in FIG. 11. As understood from the equation (11), the assigned code amount LG(n) is proportional to the block power PW(n). In view of this fact, the assigned code amount LG(n) for the n-th block may be approximately calculated according to the following equation.

$$LG(n) = K(\alpha) \cdot PW(n) \cdot L2 \qquad (12)$$

where the character $K(\alpha)$ denotes a predetermined constant of the proportion between the block power and the code amount for a scale factor $\alpha$. It is possible to statistically determine the constant $K(\alpha)$.

As previously described, in this embodiment, the limitations on the code amounts of the respective blocks are finely controlled in accordance with the block powers respectively although the average code amounts (L1 and L2) per block are regarded as being fixed. Accordingly, the amount of resultant coded data can be controlled at essentially the target amount while the coding can be well suited to local features of an image and also the deterioration in the quality of the image can be reduced. Since the process of limiting the amount of resultant coded data is executed only at an end of the coding of every field, it is possible to effectively suppress the deterioration in the image quality.

In the case where data representing an edge of an image is coded last, the deterioration in the image quality which is caused by the limitation of the resultant code amount can be inconspicuous in visual sensation.

While the two different average code amounts L1 and L2 are used in this embodiment, more average code amounts may be used. Furthermore, the limitation of the resultant code amount may be executed in unit of a plurality of blocks.

DESCRIPTION OF THE FOURTH PREFERRED EMBODIMENT

Figure 12:
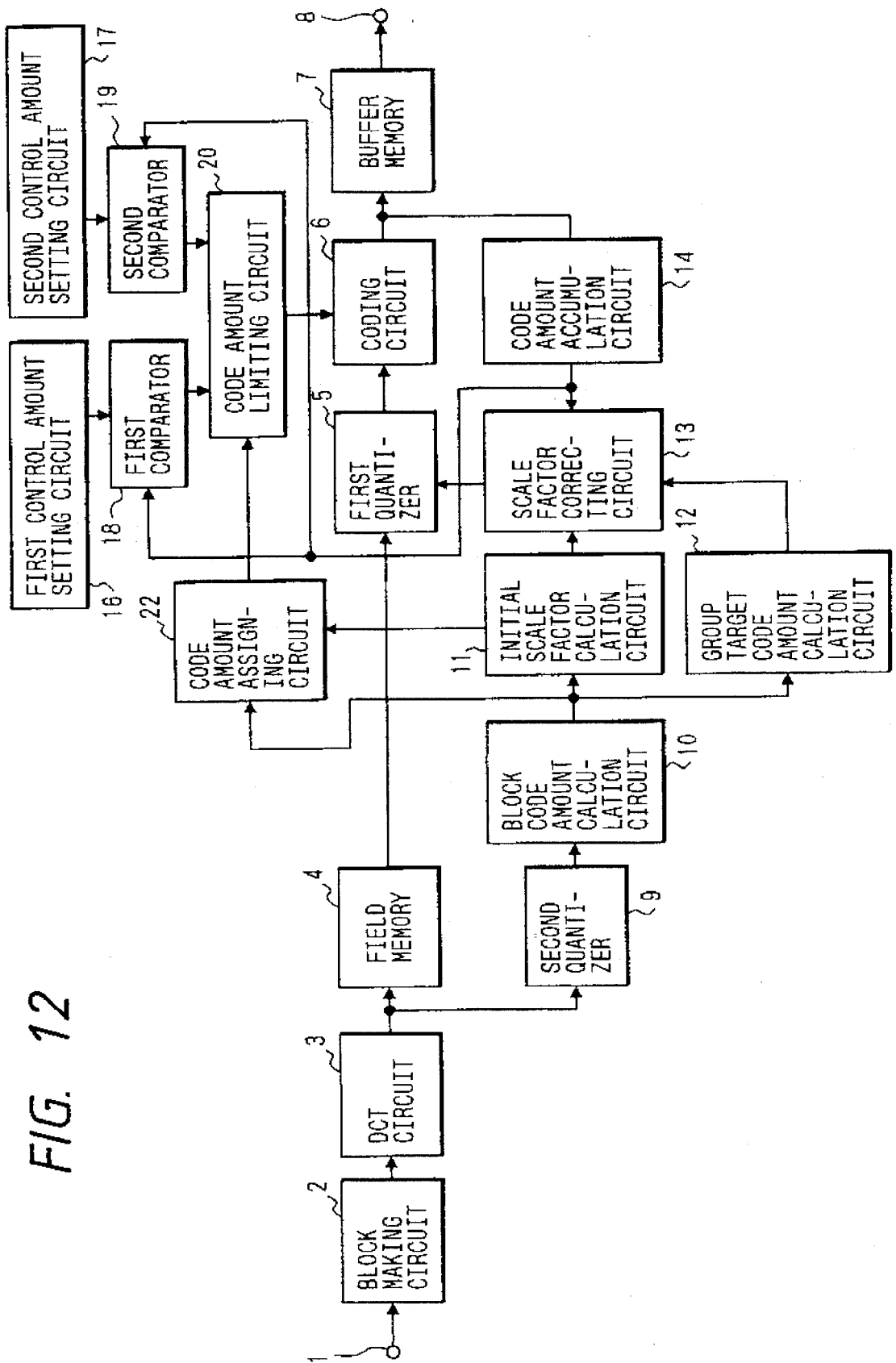
FIG. 12 is a block diagram of an image data coding apparatus according to a fourth embodiment of this invention.

FIG. 12 shows a fourth embodiment of this invention which is similar to the embodiment of FIGS. 9–11 except that a code amount assigning circuit 22 replaces the block power calculation circuit 21 of FIG. 9. The code amount assigning circuit 22 is connected among a block code amount calculation circuit 10, an initial scale factor calculation circuit 11, and a code amount limiting circuit 20.

During a pre-scanning process, the block code amount calculation circuit 10 informs the code amount assigning circuit 22 of the calculated code amount per block. The code amount assigning circuit 22 determines assigned code amounts LG in the blocks in accordance with the calculated code amounts in the blocks respectively.

The code amount limiting circuit 20 controls a Huffman coding circuit 6 in response to information from a first comparator 18, information from a second comparator 19, and the information from the code amount assigning circuit 22. Specifically, in the case where the first comparator 18 detects that an actual accumulated code amount exceeds a first control code amount, the code amount limiting circuit 20 controls the Huffman coding circuit 6 in response to the information from the first comparator 18 so that only the DC coefficient of the DCT coefficients will be coded. In the case where the second comparator 19 detects that the actual accumulated code amount exceeds a second control code amount, the code amount limiting circuit 20 controls the Huffman coding circuit 6 in response to the information from the second comparator 19 so that the amounts of resultant coded data will remain in the assigned amounts LG fed from the code amount assigning circuit 22 respectively.

The information outputted to the code amount assigning circuit 22 from the block code amount calculation circuit 10 represents the calculated code amount per block which results from the coding and the quantization using selected one of the M different scale factors $\alpha 1, \alpha 2, \ldots, \alpha M$. The initial scale factor calculation circuit 11 informs the code amount assigning circuit 22 of the relations between the scale factors and the corresponding predicted code amounts. The code amount assigning circuit 22 predicts a code amount TG per block which relates to the currently-used scale factor. For example, in the case where a second quantizer 9 assigns the scale factor $\alpha 1$ to a block in question and the currently-used scale factor equals the initial scale factor $\alpha init$, the code amount assigning circuit 22 predicts the one-block code amount TG by referring to the relation between the scale factor and the code amount in FIG. 7. Specifically, the predicted one-block code amount TG is given as:

$$TG = S \frac{Nt}{Nl} \tag{13}$$

where the letter S denotes the one-block code amount outputted from the block code amount calculation circuit 10.

The letter B is now introduced as an indication of the total number of the blocks composing one field. The code amount assigning circuit 22 determines the assigned code amount LG(n) for the n-th block according to the following equation.

$$LG(n) = \{TG(n) \cdot L2\} / \left\{ \sum_{i=n}^{B} TG(i)/(B-n) \right\} \tag{14}$$

where the letter TG(n) denotes the predicted code amount for the n-th block. As understood from the equation (14), the assigned code amount LG(n) is proportional to the predicted one-block code amount TG(n). In view of this fact, the assigned code amount LG(n) for the n-th block may be approximately calculated according to the following equation.

$$LG(n) = L(\alpha) \cdot TG(n) \cdot L2 \tag{15}$$

where the character $K(\alpha)$ denotes a predetermined constant of the proportion between the block power and the code amount for a scale factor $\alpha$. It is possible to statistically determine the constant $L(\alpha)$.

As understood from the previous description, in this invention, the limitations on the code amounts are finely controlled block by block. In addition, since the predicted one-block code amount is determined in accordance with the parameter used in the calculation of the initial scale factor $\alpha init$, the accuracy of the control of the actual code amount can be enhanced without increasing the circuit scale.

In the case where data representing an edge of an image is coded last, the deterioration in the image quality which is caused by the limitation of the resultant code amount can be inconspicuous in visual sensation.

DESCRIPTION OF THE FIFTH PREFERRED EMBODIMENT

Figure 13:
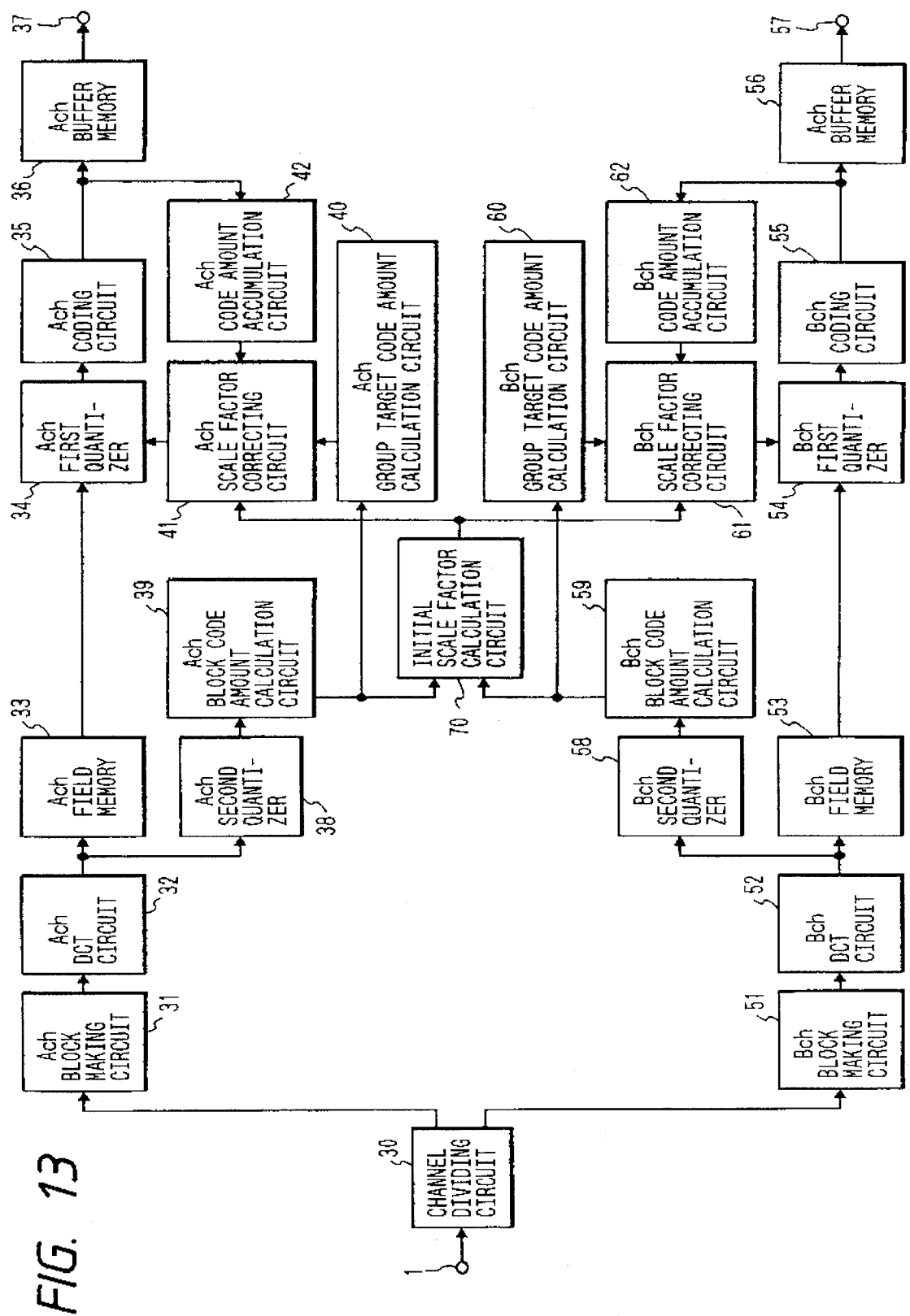
FIG. 13 is a block diagram of an image data coding apparatus according to a fifth embodiment of this invention.

FIG. 13 shows an image data coding apparatus according to a fifth embodiment of this invention which is designed to process multi-channel image data, for example, two-channel image data. The image data coding apparatus of FIG. 13 has two sections corresponding to an A channel and a B channel respectively. The A channel and the B channel are generally denoted by "Ach" and "Bch" respectively. Each section of the image data coding apparatus of FIG. 13 is basically similar to the image data coding apparatus of FIG. 1.

The image data coding apparatus of FIG. 13 includes an input terminal 1 connected to a channel dividing circuit 30 followed by the Ach section and the Bch section.

The Ach section includes a block making circuit 31 connected to the channel dividing circuit 30. The block making circuit 31 is followed by a DCT (discrete cosine transform) circuit 32. The DCT circuit 32 is connected to a field memory 33 sequentially followed by a first quantizer 34 and a Huffman coding circuit 35. The Huffman coding circuit 35 is connected to a buffer memory 36. The DCT circuit 32 is also connected to a second quantizer 38 followed by a block code amount calculation circuit 39. The block code amount calculation circuit 39 is connected to an initial scale factor calculation circuit 70 and a group target code amount calculation circuit 40. The initial scale factor calculation circuit 70 and the group target code amount calculation circuit 40 are connected to a scale factor correcting circuit 41. A code amount accumulation circuit 42 which follows the Huffman coding circuit 35 is also connected to the scale factor correcting circuit 41. The scale factor correcting circuit 41 is connected to the first quantizer 34. The buffer memory 36 is connected to an output terminal 37.

The Bch section includes a block making circuit 51 connected to the channel dividing circuit 30. The block making circuit 51 is followed by a DCT (discrete cosine transform) circuit 52. The DCT circuit 52 is connected to a field memory 53 sequentially followed by a first quantizer 54 and a Huffman coding circuit 55. The Huffman coding circuit 55 is connected to a buffer memory 56. The DCT circuit 52 is also connected to a second quantizer 58 followed by a block code amount calculation circuit 59. The block code amount calculation circuit 59 is connected to the initial scale factor calculation circuit 70 and a group target code amount calculation circuit 60. The initial scale factor calculation circuit 70 and the group target code amount calculation circuit 60 are connected to a scale factor correcting circuit 61. A code amount accumulation circuit 62 which follows the Huffman coding circuit 55 is also connected to the scale factor correcting circuit 61. The scale factor correcting circuit 61 is connected to the first quantizer 54. The buffer memory 56 is connected to an output terminal 57.

Figure 14:
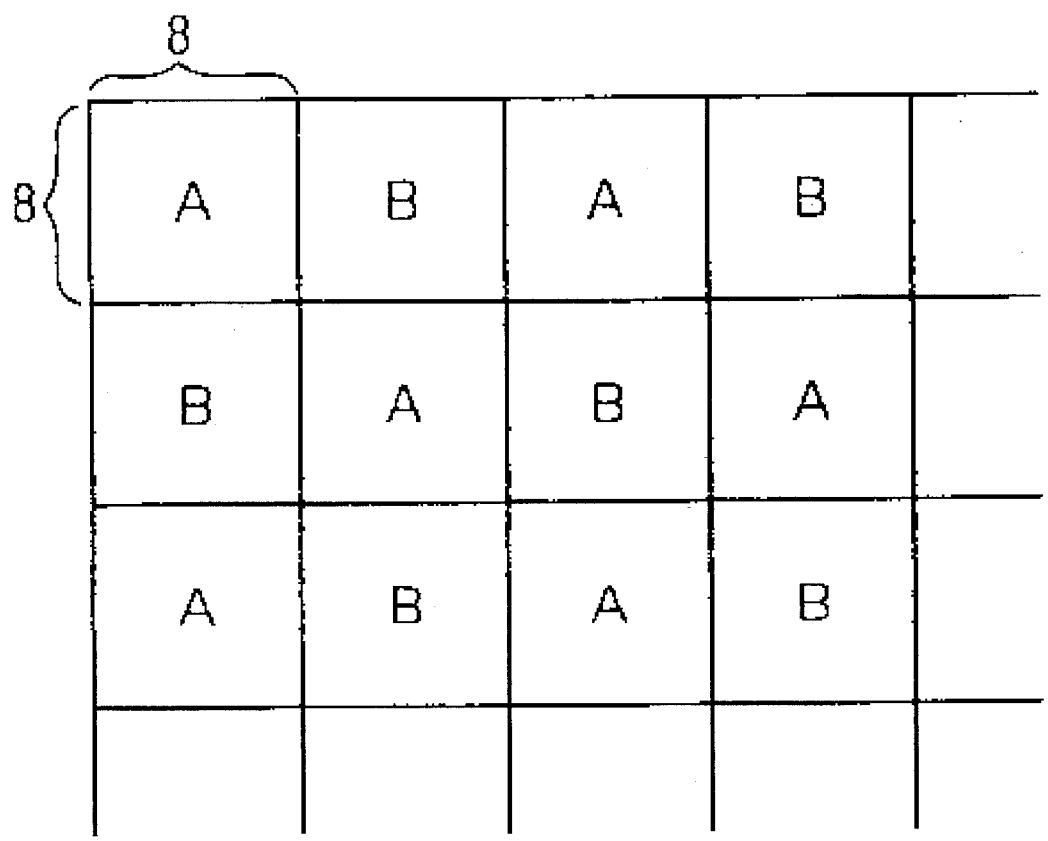
FIG. 14 is a diagram of channel division in one field in the fifth embodiment.

Input image data is fed via the input terminal 1 to the channel dividing circuit 30. The image data is divided by the channel dividing circuit 30 into A and B channels. Specifically, as shown in FIG. 14, first alternate ones of segments of image data of every field are grouped into the A channel while second alternate ones are grouped into the B channel. The channel dividing circuit 30 outputs the Ach image data to the Ach block making circuit 31. The channel dividing circuit 30 outputs the Bch image data to the Bch block making circuit 51.

The Ach image data of every field is divided by the Ach block making circuit 31 into a predetermined number of blocks each corresponding to 8 by 8 pixels. The Ach block making circuit 31 outputs the Ach image data of successive blocks. The Ach DCT circuit 32 following the Ach block making circuit 31 subjects the Ach image data of each of successive blocks to discrete cosine transform (DCT) which is a kind of orthogonal transform. Thus, the Ach DCT circuit 32 converts the Ach image data of each block into 64 Ach DCT coefficients.

As shown in FIG. 2, the 64 Ach DCT coefficients which correspond to one block are scanned in zigzag, being sequentially outputted from the Ach DCT circuit 32 in a zigzag order. The Ach DCT coefficients outputted from the Ach DCT circuit 32 are fed to the Ach field memory 33, being temporarily stored in the Ach field memory 33 and being then outputted therefrom. Thereby, the Ach DCT coefficients are delayed by a given period corresponding to one field. The Ach first quantizer 34 receives the Ach DCT coefficients from the Ach field memory 33, and linearly quantizes the Ach DCT coefficients with variable quantization values which are determined for the respective Ach DCT coefficients. The quantization values are equal to quantization steps multiplied by a variable Ach scale factor $\alpha t$ fed to the Ach first quantizer 34 from the Ach scale factor correcting circuit 41.

The Ach Huffman coding circuit 35 which follows the Ach first quantizer 34 codes the output data from the Ach first quantizer 34 into a two-dimensional Huffman code having variable-length words. The Ach Huffman coding circuit 35 outputs the Huffman code words as variable-length Ach coded data which is stored into the Ach buffer memory 36. Information or data representing the scale factor $\alpha t$ fed to the Ach first quantizer 34 is also stored into the Ach buffer memory 36. The variable-length Ach coded data and the Ach scale factor data are read out from the Ach buffer memory 36, being transmitted via the Ach output terminal 37 at a predetermined bit rate.

The Ach second quantizer 38, the Ach block code amount calculation circuit 39, the initial scale factor calculation circuit 70, and the Ach group target code amount calculation circuit 40 operate during a pre-scanning process.

The Ach DCT coefficients outputted from the Ach DCT circuit 32 are also fed to the Ach second quantizer 38. During the pre-scanning process, the Ach second quantizer 38 operates as follows. In the Ach second quantizer 38, as shown in FIG. 4, the blocks composing one field are separated into K different groups according to the order of outputting of coded data where K denotes a predetermined natural number equal to two or greater. Furthermore, M different scale factors $\alpha 1, \alpha 2, \ldots, \alpha M$ having a relation as "$\alpha 1 < \alpha 2 < \ldots < \alpha M$" are assigned to the blocks composing one field where M denotes a predetermined natural number equal to two or greater. One of the scale factors $\alpha 1, \alpha 2, \ldots, \alpha M$ and one of the quantization steps are assigned to an Ach DCT coefficient. The Ach second quantizer 38 linearly quantizes each Ach DCT coefficient with a quantization value which is equal to the product of the assigned scale factor and the assigned quantization step.

During the pre-scanning process, the Ach block code amount calculation circuit 39 uses the output data from the Ach second quantizer 38 in calculating or estimating the amount (the number of bits) of Ach coded data per block which results from assumptive two-dimensional Huffman coding of the Ach DCT coefficients quantized by using one of the scale factors $\alpha 1, \alpha 2, \ldots, \alpha M$.

During the pre-scanning process, the initial scale factor calculation circuit 70 is sequentially informed of the calculated amounts of Ach coded data in the respective blocks by the Ach block code amount calculation circuit 39. As will be made clear later, the initial scale factor calculation circuit 70 is also sequentially informed of calculated amounts of Bch coded data in respective blocks by the Bch block code amount calculation circuit 59. The initial scale factor calculation circuit 70 calculates an initial scale factor $\alpha init$ on the basis of the information from the Ach block code amount calculation circuit 39 and the information from the Bch block code amount calculation circuit 59.

The Ach group target code amount calculation circuit 40 is sequentially informed of the calculated amounts of Ach coded data in the respective blocks by the Ach block code amount calculation circuit 39. The Ach group target code amount calculation circuit 40 predicts the amount of Ach coded data in each of the K groups, which results from assumptive two-dimensional Huffman coding of the Ach DCT coefficients quantized by using the initial scale factor $\alpha init$ in common for the blocks, on the basis of the information from the Ach block code amount calculation circuit 39.

The Ach code amount accumulation circuit 42 receives the output coded data from the Ach Huffman coding circuit 35. The Ach code amount accumulation circuit 42 accumulates the Ach coded data in bit number and thereby calculates the accumulated amount (the accumulated number of bits) of the Ach coded data, that is, the actual accumulated Ach code amount.

The Ach scale factor correcting circuit 41 is informed of the predicted Ach code amounts in the respective groups by the Ach group target code amount calculation circuit 40. In addition, the Ach scale factor correcting circuit 41 is informed of the actual accumulated Ach code amount by the Ach code amount accumulation circuit 42. Furthermore, the Ach scale factor correcting circuit 41 is informed of the initial scale factor $\alpha init$ by the initial scale factor calculation circuit 70. The Ach scale factor correcting circuit 41 accumulates and adds the predicted Ach one-group code amounts into a predicted accumulated Ach code amount. The Ach scale factor correcting circuit 41 calculates a prediction error $\Delta$ which is equal to the difference between the predicted accumulated code amount and the actual accumulated code amount for every group. Each time the coding and outputting of data in one group is completed, the Ach scale factor correcting circuit 41 corrects the scale factor $\alpha t$ for a next group in accordance with the calculated prediction error $\Delta$. The Ach scale factor correcting circuit 41 feeds the Ach first quantizer 34 with the correction-resultant scale factor $\alpha t$.

The Bch image data of every field is divided by the Bch block making circuit 51 into a predetermined number of blocks each corresponding to 8 by 8 pixels. The Bch block making circuit 51 outputs the Bch image data of successive blocks. The Bch DCT circuit 52 following the Bch block making circuit 51 subjects the Bch image data of each of successive blocks to discrete cosine transform (DCT) which is a kind of orthogonal transform. Thus, the Bch DCT circuit 52 converts the Bch image data of each block into 64 Bch DCT coefficients.

As shown in FIG. 2, the 64 Bch DCT coefficients which correspond to one block are scanned in zigzag, being sequentially outputted from the Bch DCT circuit 52 in a zigzag order. The Bch DCT coefficients outputted from the Bch DCT circuit 52 are fed to the Bch field memory 53, being temporarily stored in the Bch field memory 53 and being then outputted therefrom. Thereby, the Bch DCT coefficients are delayed by a given period corresponding to one field. The Bch first quantizer 54 receives the Bch DCT coefficients from the Bch field memory 53, and linearly quantizes the Bch DCT coefficients with variable quantization values which are determined for the respective Bch DCT coefficients. The quantization values are equal to quantization steps multiplied by a variable Bch scale factor αt fed to the Bch first quantizer 54 from the Bch scale factor correcting circuit 61.

The Bch Huffman coding circuit 55 which follows the Bch first quantizer 54 codes the output data from the Bch first quantizer 54 into a two-dimensional Huffman code having variable-length words. The Bch Huffman coding circuit 55 outputs the Huffman code words as variable-length Bch coded data which is stored into the Bch buffer memory 56. Information or data representing the scale factor αt fed to the Bch first quantizer 54 is also stored into the Bch buffer memory 56. The variable-length Bch coded data and the Bch scale factor data are read out from the Bch buffer memory 56, being transmitted via the Bch output terminal 57 at a predetermined bit rate.

The Bch second quantizer 58, the Bch block code amount calculation circuit 59, the initial scale factor calculation circuit 70, and the Bch group target code amount calculation circuit 60 operate during a pre-scanning process.

The Bch DCT coefficients outputted from the Bch DCT circuit 52 are also fed to the Bch second quantizer 58. During the pre-scanning process, the Bch second quantizer 58 operates as follows. In the Bch second quantizer 58, as shown in FIG. 4, the blocks composing one field are separated into K different groups according to the order of outputting of coded data where K denotes a predetermined natural number equal to two or greater. Furthermore, M different scale factors $\alpha 1, \alpha 2, \ldots, \alpha M$ having a relation as "$\alpha 1 < \alpha 2 < \ldots < \alpha M$" are assigned to the blocks composing one field where M denotes a predetermined natural number equal to two or greater. One of the scale factors $\alpha 1, \alpha 2, \ldots, \alpha M$ and one of the quantization steps are assigned to a Bch DCT coefficient. The Bch second quantizer 58 linearly quantizes each Bch DCT coefficient with a quantization value which is equal to the product of the assigned scale factor and the assigned quantization step.

During the pre-scanning process, the Bch block code amount calculation circuit 59 uses the output data from the Bch second quantizer 58 in calculating or estimating the amount (the number of bits) of Bch coded data per block which results from assumptive two-dimensional Huffman coding of the Bch DCT coefficients quantized by using one of the scale factors $\alpha 1, \alpha 2, \ldots, \alpha M$.

During the pre-scanning process, the initial scale factor calculation circuit 70 is sequentially informed of the calculated amounts of Bch coded data in the respective blocks by the Bch block code amount calculation circuit 59. As previously described, the initial scale factor calculation circuit 70 is also sequentially informed of the calculated amounts of Ach coded data in the respective blocks by the Ach block code amount calculation circuit 39. The initial scale factor calculation circuit 70 calculates the initial scale factor αinit on the basis of the information from the Ach block code amount calculation circuit 39 and the information from the Bch block code amount calculation circuit 59.

The Bch group target code amount calculation circuit 60 is sequentially informed of the calculated amounts of Bch coded data in the respective blocks by the Bch block code amount calculation circuit 59. The Bch group target code amount calculation circuit 60 predicts the amount of Bch coded data in each of the K groups, which results from assumptive two-dimensional Huffman coding of the Bch DCT coefficients quantized by using the initial scale factor αinit in common for the blocks, on the basis of the information from the Bch block code amount calculation circuit 59.

The Bch code amount accumulation circuit 62 receives the output coded data from the Bch Huffman coding circuit 55. The Bch code amount accumulation circuit 62 accumulates the Bch coded data in bit number and thereby calculates the accumulated amount (the accumulated number of bits) of the Bch coded data, that is, the actual accumulated Bch code amount.

The Bch scale factor correcting circuit 61 is informed of the predicted Bch code amounts in the respective groups by the Bch group target code amount calculation circuit 60. In addition, the Bch scale factor correcting circuit 61 is informed of the actual accumulated Bch code amount by the Bch code amount accumulation circuit 62. Furthermore, the Bch scale factor correcting circuit 61 is informed of the initial scale factor αinit by the initial scale factor calculation circuit 70. The Bch scale factor correcting circuit 61 accumulates and adds the predicted Bch one-group code amounts into a predicted accumulated Bch code amount. The Bch scale factor correcting circuit 61 calculates a prediction error $\Delta$ which is equal to the difference between the predicted accumulated code amount and the actual accumulated code amount for every group. Each time the coding and outputting of data in one group is completed, the Bch scale factor correcting circuit 61 corrects the scale factor at for a next group in accordance with the calculated prediction error $\Delta$. The Bch scale factor correcting circuit 61 feeds the Bch first quantizer 54 with the correction-resultant scale factor αt.

As previously described, in this embodiment, the image data of every field is divided into the two channels. The coding of the image data in the respective channels is executed in a manner such that the amounts of resultant coded data will be substantially equal to or smaller than the given code amounts in the respective channels. The initial scale factor calculation circuit 70 determines the initial scale factor αinit by referring to the relation between the scale factor and the code amounts in the two channels. Thus, the accuracy of the prediction of the initial scale factor αinit can be enhanced. The correction of the scale factor is executed in each of the channels, and hence the code amount control can be fine. As shown in FIG. 14, the channel division is of the alternate type. Therefore, local features of an image disperse between the two channels, and substantially equal code amounts can be attained for the respective channels and thereby the accuracy of the code amount control can be enhanced. In addition, the difference in image quality between the channels is essentially nullified, and the quality of the composite image can be increased.

While the two-channel coding is executed in this embodiment, three-channel or more channel coding may be done.

DESCRIPTION OF THE OTHER PREFERRED EMBODIMENTS

A sixth embodiment of this invention is similar to one of the embodiments of FIGS. 1–14 except that a unit for the data compression (the data amount control) corresponds to a frame or a macro-block having a plurality of blocks rather than a field.

A seventh embodiment of this invention is similar to one of the embodiments of FIGS. 1–14 except that sampling is done on some blocks rather than all the blocks during the pre-scanning process.

An eight embodiment of this invention is similar to one of the embodiments of FIGS. 1–14 except that the orthogonal transform is LOT or Hadamard transform rather than DCT.

What is claimed is:

1. An image data coding apparatus comprising:

means for dividing input image data into a plurality of blocks;

an orthogonal transform device for subjecting the input image data to orthogonal transformation for every block;

a memory for storing output data from the orthogonal transform device and outputting the stored data in a predetermined output order;

a first quantizer for quantizing output data from the memory;

a coding device for coding output data from the first quantizer into variable-length code words;

a code amount accumulation device for accumulating a code amount of output data from the coding device;

a second quantizer for separating the output data from the orthogonal transform device into K different groups according to the predetermined output order in the memory, and for assigning respective ones of M different scale factors to respective ones of said plurality of blocks and quantizing the output data from the orthogonal transform device in the respective blocks in accordance with the respective scale factors, where K and M denote predetermined natural numbers;

a block code amount calculation device for calculating a code amount per block which results from assumptive variable-length coding of output data from the second quantizer;

an initial scale factor calculation device for predicting M code amounts, which result from assumptive coding of one of a frame or a field in accordance with the M different scale factors respectively, from block code amounts represented by output data from the block code amount calculation device, and for determining an initial scale factor designed to make said one of a frame or field into a predetermined code amount;

a group target code amount calculation device for predicting target code amounts in respective ones of said plurality of K different groups, which result from assumptive coding and quantization, from the block code amounts represented by the output data from the block code amount calculation device; and a scale factor correcting device for correcting the initial scale factor in response to a prediction error between an actual code amount accumulated by the code amount accumulation device and a predicted target code amount from the group target code amount calculation device each time the coding device completes the coding of data of one group, and thereby for correcting the initial scale factor in the first quantizer.

2. The image data coding apparatus of claim 1, wherein the scale factor correcting device comprises means for calculating the prediction error between the actual code amount accumulated by the code amount accumulation device and the predicted target code amount each time the coding device completes the coding of data of one group, means for calculating a sum of target code amounts in next and later groups, means for subtracting said prediction error from said sum, means for setting a result of said subtracting as an updated target code amount in the next and later groups, and means for determining a scale factor corrected by the scale factor correcting device in the next group in accordance with said updated target code amount.

3. The image data coding apparatus of claim 1, wherein said second quantizer is connected for receiving the output data directly from the orthogonal transform device and free of said memory therebetween.

4. The image data coding apparatus of claim 1, wherein said second quantizer is connected for receiving the output data directly from the orthogonal transform device and free of said memory therebetween.

5. The image data coding apparatus of claim 1, wherein the block code amount calculation device comprises means for adding the target code amounts in the respective blocks quantized by the M different scale factors, means for deriving activities of respective ones of the K different groups and an activity of one of the frame and the field from a result of said adding of the target code amounts in the respective blocks, means for normalizing the activities of the respective K groups with the activity of one of the frame and the field, and means for predicting the target code amounts in the respective K groups, which occur in cases where said one of the frame and the field has a given code amount, from a result of said normalizing of the activities.

6. The image data coding apparatus of claim 5, wherein a total number of the blocks in said one of the frame and the field is equal to a multiple of a product of M and K, and numbers of the blocks corresponding to the respective scale factors in each of the K different groups are equal to each other.

7. An image data coding apparatus comprising:

means for quantizing first image data into second image data in response to a correctable first scale factor;

means for coding the second image data into coded data;

means for quantizing the first image data into third image data in response to predetermined different second scale factors;

means for estimating total numbers of coded data bits, which relate to the second scale factors respectively, in one of a frame and a field from the third image data;

means for determining an initial scale factor and a predetermined target total number of coded data bits in said one of the frame and the field in response to said estimated total numbers of coded data bits;

means for accumulating the coded data in bit number to detect an actual accumulation bit number of the coded data during a period corresponding to said one of the frame and the field;

means for estimating a predicted accumulation bit number of the coded data in response to the third image data and the initial scale factor during a period corresponding to said one of the frame and the field;

means for periodically calculating a prediction error between the actual accumulation bit number and the predicted accumulation bit number during a period corresponding to said one of the frame and the field; and means for periodically correcting the first scale factor in response to the prediction error and to the means for determining an initial scale factor during a period corresponding to said one of the frame and the field.

8. A method comprising the steps of:

quantizing first image data into second image data in response to a correctable first scale factor;

coding the second image data into coded data;

quantizing the first image data into third image data in response to predetermined different second scale factors;

estimating total numbers of coded data bits, which relate to the second scale factors respectively, in one of a frame and a field from the second quantized image data;

determining an initial scale factor and a predetermined target total number of coded data bits in said one of the frame and the field in response to said estimated total numbers of coded data bits;

accumulating the coded data in bit number to detect an actual accumulation bit number of the coded data during a period corresponding to said one of the frame and the field;

estimating a predicted accumulation bit number of the coded data in response to the third image data and the initial scale factor during a period corresponding to said one of the frame and the field;

periodically calculating a prediction error between the actual accumulation bit number and the predicted accumulation bit number during a period corresponding to said one of the frame and the field; and periodically correcting the first scale factor in response to the prediction error and to the step of determining an initial scale factor during a period corresponding to said one of the frame and the field.

* * * * *